US012267569B2

(12) United States Patent
Seshadri

(10) Patent No.: US 12,267,569 B2
(45) Date of Patent: Apr. 1, 2025

(54) PLENOPTIC SENSOR DEVICES, SYSTEMS, AND METHODS

(71) Applicant: Motional AD LLC, Boston, MA (US)

(72) Inventor: Nivi Seshadri, Quincy, MA (US)

(73) Assignee: MOTIONAL AD LLC, Boston, MA (US)

(*) Notice: Subject to any disclaimer, the term of this patent is extended or adjusted under 35 U.S.C. 154(b) by 3 days.

(21) Appl. No.: 18/059,289

(22) Filed: Nov. 28, 2022

(65) Prior Publication Data

US 2024/0129604 A1 Apr. 18, 2024

Related U.S. Application Data

(60) Provisional application No. 63/379,593, filed on Oct. 14, 2022.

(51) Int. Cl.
*H04N 13/239* (2018.01)
*G06T 7/50* (2017.01)
*G06V 10/141* (2022.01)
*H04N 23/11* (2023.01)

(52) U.S. Cl.
CPC .............. *H04N 23/11* (2023.01); *G06T 7/50* (2017.01); *G06V 10/141* (2022.01); *G06T 2207/10048* (2013.01); *G06T 2207/10052* (2013.01); *G06T 2207/30252* (2013.01)

(58) Field of Classification Search
CPC . H04N 23/11; G06T 7/50; G06T 2207/10048; G06T 2207/10052; G06T 2207/30252; G06V 10/141
See application file for complete search history.

(56) References Cited

U.S. PATENT DOCUMENTS 7,884,327 B2 * 2/2011 Sato ................... G06V 10/141
250/330
9,240,049 B2 * 1/2016 Ciurea ................ H04N 13/232
9,647,150 B2 5/2017 Blasco Claret
(Continued)

FOREIGN PATENT DOCUMENTS

WO WO 2020/182591 A1 9/2020

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
(Continued)

*Primary Examiner* — Philip P. Dang
(74) *Attorney, Agent, or Firm* — Knobbe Martens Olson & Bear LLP

(57) ABSTRACT

This application relates to sensor systems and related devices and methods. A sensor device can include an image sensor configured to generate image data based on infrared light received at the image sensor, a primary lens positioned to direct light from a scene onto the image sensor, and an array of microlenses positioned between the image sensor and the primary lens, each microlens configured to focus the light from the scene onto a corresponding portion of the image sensor. A method can include receiving plenoptic image data based on infrared light, generating a two-dimensional image of a scene, and determining a depth to an object represented by the pixel based on the plenoptic image data.

14 Claims, 7 Drawing Sheets

(56) References Cited

U.S. PATENT DOCUMENTS

| | | | | |
|---|---|---|---|---|
| 9,712,759 | B2* | 7/2017 | Venkataraman | H04N 25/581 |
| 9,843,787 | B2* | 12/2017 | Georgiev | G06T 5/50 |
| 10,244,181 | B2* | 3/2019 | Warren | H04N 23/56 |
| 10,353,463 | B2* | 7/2019 | Shtukater | H04N 23/62 |
| 10,401,158 | B2* | 9/2019 | Gernoth | G06V 10/145 |
| 10,542,208 | B2* | 1/2020 | Lelescu | G06T 7/20 |
| 10,565,734 | B2* | 2/2020 | Bevensee | G06T 7/521 |
| 10,650,540 | B2* | 5/2020 | Gernoth | G06T 7/514 |
| 10,805,594 | B2* | 10/2020 | Bikumandla | H04N 13/211 |
| 11,030,776 | B2* | 6/2021 | Baumgart | G06T 5/80 |
| 11,412,158 | B2* | 8/2022 | Venkataraman | G06T 11/60 |
| 11,443,524 | B2* | 9/2022 | Aguiar | G01S 17/86 |
| 11,443,550 | B2* | 9/2022 | Ren | G06V 40/40 |
| 11,525,906 | B2* | 12/2022 | Kadambi | G06T 7/593 |
| 11,763,492 | B1* | 9/2023 | Ganguli | H04N 13/128 |
| | | | | 348/47 |
| 11,792,538 | B2* | 10/2023 | Venkataraman | H04N 5/265 |
| | | | | 348/222.1 |
| 2013/0222603 | A1* | 8/2013 | Agranov | H04N 25/131 |
| | | | | 348/164 |
| 2020/0195837 | A1 | 6/2020 | Miu et al. | |
| 2020/0296336 | A1* | 9/2020 | Higashitsutsumi | H04N 5/33 |
| 2021/0118177 | A1* | 4/2021 | Palmer | A61B 3/12 |
| 2022/0270279 | A1* | 8/2022 | Leitner | G06T 7/557 |
| 2023/0177713 | A1* | 6/2023 | Yokokawa | H04N 13/15 |
| | | | | 382/154 |
| 2024/0004282 | A1* | 1/2024 | Wolk | B29C 59/14 |

OTHER PUBLICATIONS

International Search Report and Written Opinion received for PCT Application No. PCT/US2023/034852, mailed on Jan. 24, 2024.

* cited by examiner

PLENOPTIC SENSOR DEVICES, SYSTEMS, AND METHODS

PRIORITY APPLICATION

This application claims priority to U.S. Provisional Application No. 63/379,593, filed Oct. 14, 2022, which is incorporated herein by reference. Any and all applications for which a foreign or domestic priority claim is identified in the Application Data Sheet as filed with the present application are hereby incorporated by reference under 37 CFR 1.57.

BACKGROUND

The present application relates to sensor devices for capturing three-dimensional image data. Some embodiments relate to plenoptic sensor devices, systems, and methods.

DETAILED DESCRIPTION

Figure 1:
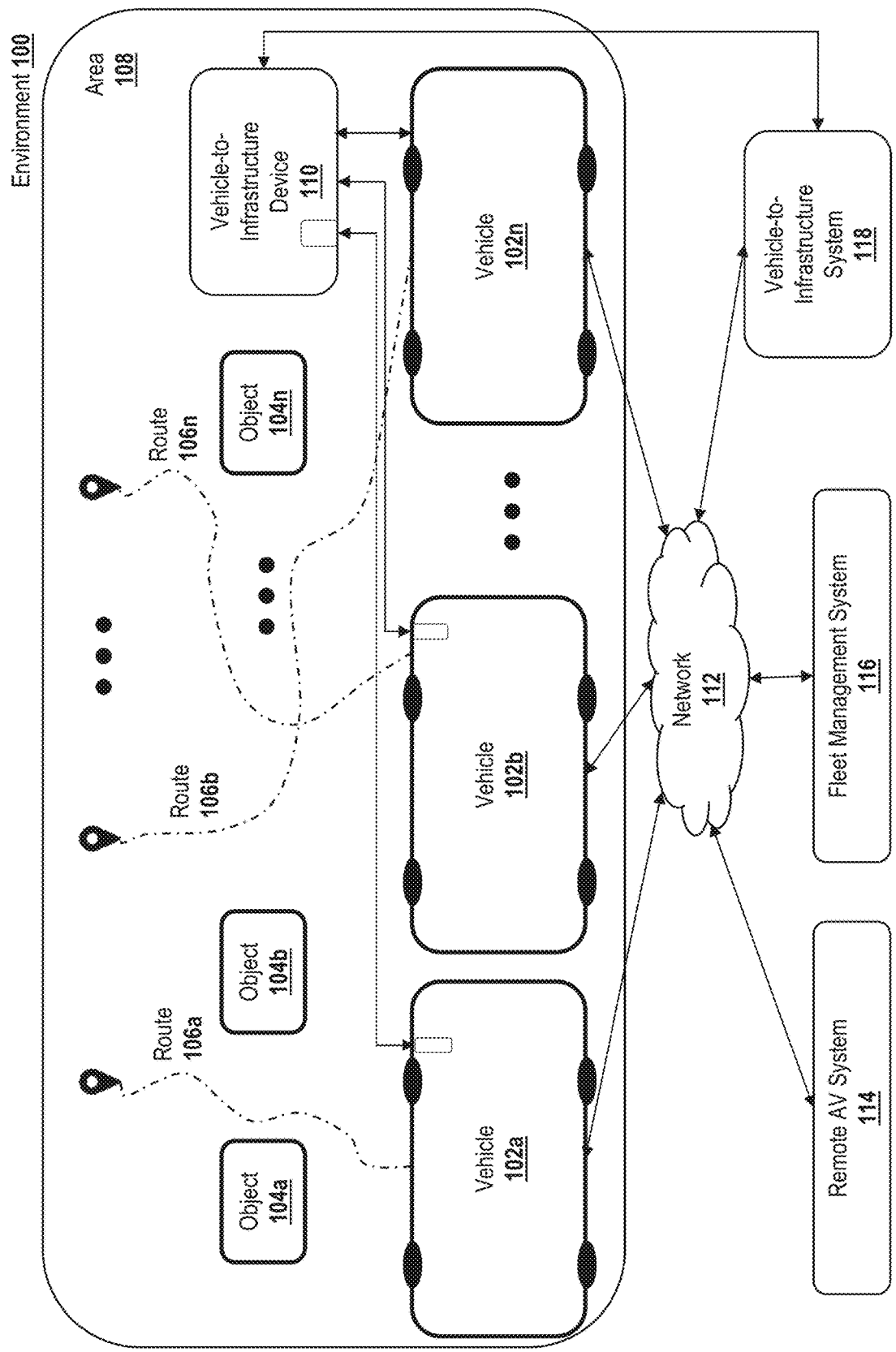
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when," "upon," "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has," "have," "having," or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement plenoptic sensor devices. The plenoptic sensor devices can be configured to provide image data (e.g., a two-dimensional image of a three-dimensional scene) as well as depth or distance data (e.g., three-dimensional data representing the distance or depth to objects present within the image). In some embodiments, the plenoptic sensor devices include an image sensor configured to generate image data based on infrared light received at the image sensor and an array of microlenses, each microlens configured to focus the light from the scene onto a corresponding portion of the image sensor.

In some instances, the infrared light can be light having a wavelength that is commonly used in LiDAR applications (such as 905 nm or 1550 nm, for example). Use of infrared light can be advantageous in that such light provides good penetration through adverse conditions (e.g., weather, fog, etc.) as well as at night, while also minimizing light pollution (such light not being visible to humans). This may be especially true when light having wavelengths that are commonly used for LiDAR is used. In some embodiments, the plenoptic sensor devices can further include a light source for illuminating the scene with the infrared light.

The array of microlenses of the plenoptic sensor devices is configured such that each microlens of the array focuses infrared light reflected from the scene onto a corresponding portion of the image sensor. This causes the image sensor to capture plenoptic image data of the scene that includes a plurality of sub-images associated with the plurality of microlenses. Each sub-image represents a portion of the image captured from a slightly different perspective. The plenoptic image data can be used to generate a two-dimensional image of the scene. The two-dimensional image can be generated from the plenoptic image data at a variety of different focal lengths, allowing different (or even all) objects within the image to be shown in focus.

Moreover, the plenoptic image data further comprises three-dimensional information associated with the image. For example, the three-dimensional information can comprise angular data from which depth or distance to objects within the image can be determined. Accordingly, the plenoptic sensor devices described herein can, in some embodiments, provide a single sensor that is able to capture both image data (e.g., a two-dimensional image of a scene) as well as three-dimensional data (e.g., data from which distance or depths to objects present within the scene can be determined).

The plenoptic sensor devices can be useful for a variety of applications. As an example, the plenoptic sensor devices can be configured for use with autonomous, semi-autonomous, or non-autonomous vehicles. The plenoptic sensor devices can be configured to capture both image and depth information associated with objects (e.g., other vehicles, pedestrians, street signs, etc.) around the vehicle. This information can be useful to operate the vehicle.

By virtue of the implementation of systems, methods, and computer program products described herein, techniques for plenoptic sensor devices can provide several advantages. For example, by using an image sensor configured for infrared light and an array of microlenses, the plenoptic sensor devices can be capable of capturing both image data and depth data of a scene. Typically, separate sensors have been needed to capture both image data and depth data. For example, typically image data is captured with conventional camera devices, while depth data is captured using LiDAR sensors.

While providing both image data and depth data in a single sensor is advantageous in that it can reduce the total number of sensors required, it also provides several other improvements or efficiencies. For example, when using multiple sensors, it is necessary to register the data of each sensor to a common reference frame to correlate the sensor data between the two sensors. By providing a single sensor with this dual functionality, the need to register or correlate this data is reduced or eliminated, as the plenoptic image data synchronously provides both image and depth data.

As another example advantage, the plenoptic sensor device can, in some embodiments, provide depth information with a higher point cloud density than traditional LiDAR devices. LiDAR point cloud density is generally limited by the number of LiDAR lasers used (typical numbers of lasers include 32 or 64 lasers) which capture data in a rotating frame of reference. In contrast, the depth data derived from the plenoptic sensors described herein is not limited to any number of LiDAR lasers as LiDAR lasers need not be used at all. Rather, the plenoptic sensor devices capture infrared light reflected from any number of sources (including flood light sources) allowing for highly increased point cloud density.

These and other features and advantages of the plenoptic sensor devices described herein will become more fully apparent from the following description.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
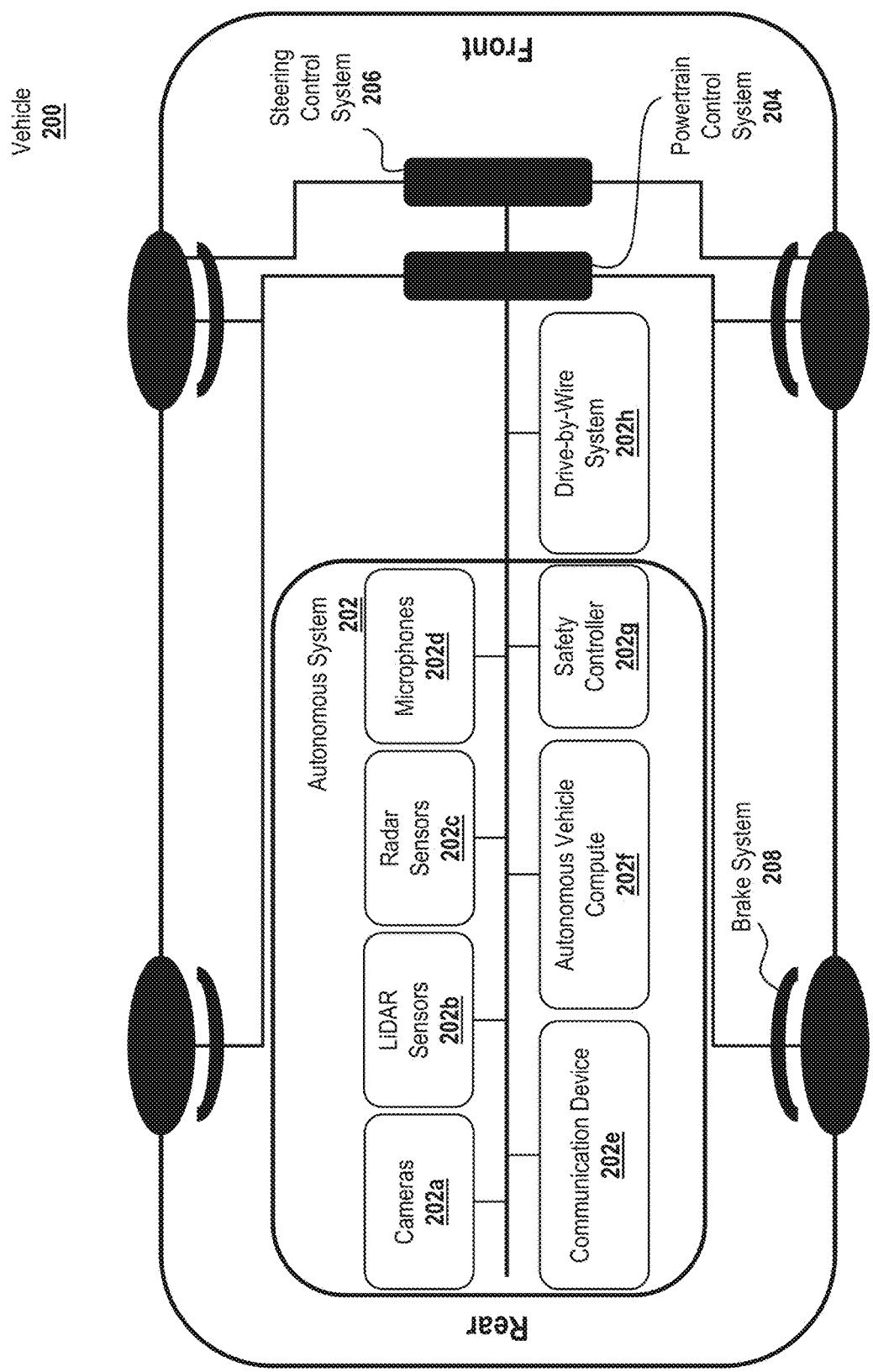
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
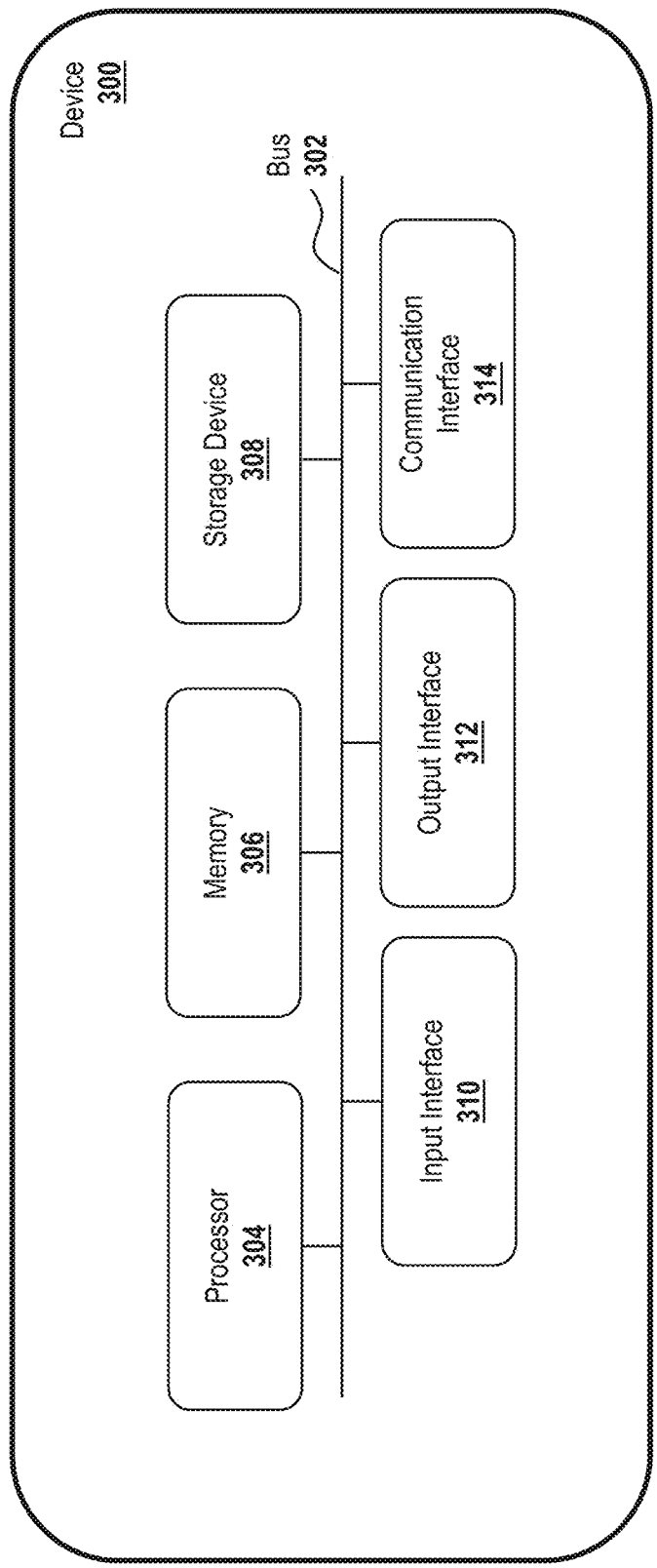
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of vehicle 200 of FIG. 2, and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
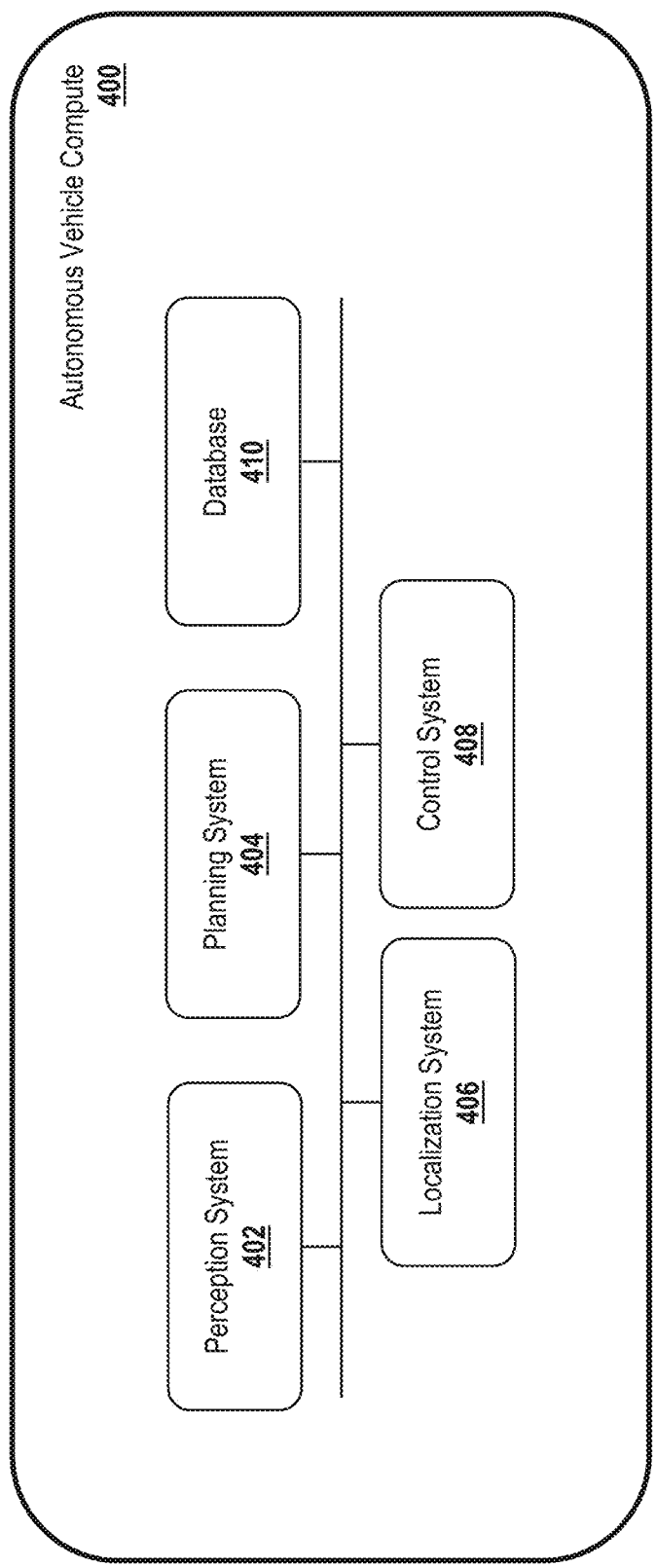
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Plenoptic Sensor Devices

Described herein are plenoptic sensor devices that can be configured to provide image data (e.g., a two-dimensional image of a three-dimensional scene) as well as depth or distance data (e.g., three-dimensional data representing the distance or depth to objects present within the image) using a single sensor device. The plenoptic sensor devices can include an array of microlenses that focus light onto an image sensor configured for use with infrared light in order to generate plenoptic image data. The plenoptic image data can be used to generate a two-dimensional image of a scene as well as three-dimensional information associated with the image. The three-dimensional information can comprise depths or distances to objects within the image. Accordingly, the plenoptic sensor devices described herein can, in some embodiments, provide a single sensor that is able to capture both image data (e.g., a two-dimensional image of a scene) as well as three-dimensional data (e.g., data from which distance or depths to objects present within the scene can be determined). While this application describes the plenoptic image data as being used to generate a two-dimensional image and depth data, in most cases, the plenoptic image data comprises a raw plenoptic image that includes many mini images borne of the projection from the individual microlenses. The full resolution images with different focal lengths and depth information are computationally generated using algorithms.

The plenoptic sensor devices can be used, for example, with autonomous, semi-autonomous, or non-autonomous vehicles. The plenoptic sensor devices can be configured to capture both image and depth information associated with objects (e.g., other vehicles, pedestrians, street signs, etc.), which can be useful to operate the vehicle. Other applications and uses for the plenoptic sensor devices are also possible.

Figure 5:
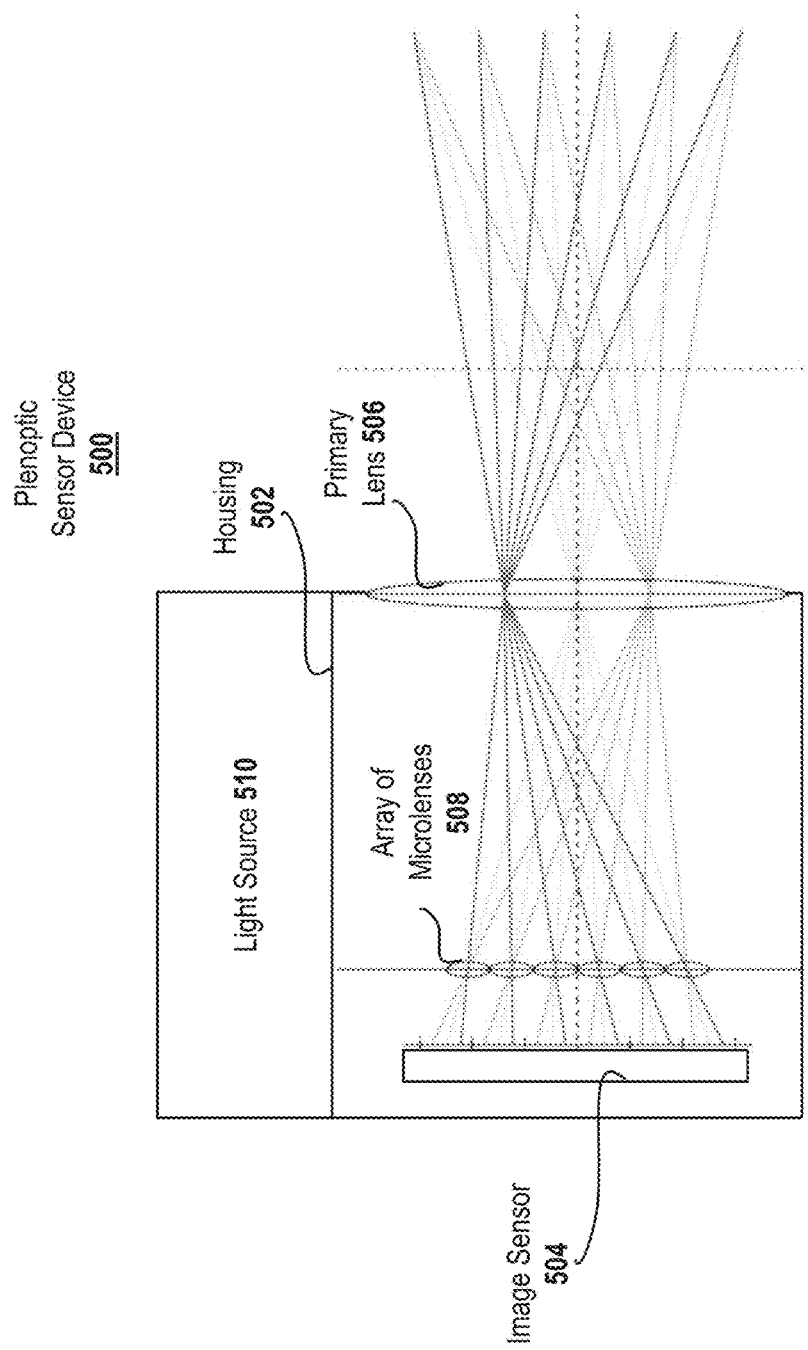
FIG. 5 is diagram of an implementation of a plenoptic sensor.

FIG. 5 is diagram of one implementation of a plenoptic sensor device 500. In the illustrated embodiment, the plenoptic sensor device 500 comprises a housing 502, an image sensor 504, a primary lens 506, an array of microlenses 508, and a light source 510.

The housing 502 can be configured to at least partially surround the various components of the plenoptic sensor device 500. For example, as shown, the image sensor 504, the primary lens 506, the array of microlenses 508, and the light source 510 can all be positioned within the housing 502. The housing 502 can be configured protect the components of the plenoptic sensor device 500 during use as well as to maintain or provide specific positional arrangements between the components of the plenoptic sensor device 500. The housing 502 may also be configured, in some embodiments, to mount to a vehicle.

As shown in FIG. 5, the housing 502 can position the primary lens 506 such that the primary lens 506 collects light which is reflected off of objects within a scene and directs that light towards an array of microlenses 508. In the illustrated embodiment, the primary lens 506 is shown at a position at a front side of the housing 502. This is one possible position, although other positions are possible. For example, the primary lens 506 may be positioned further within the housing 502 and the housing 502 may include an opening or a window that allows light from the scene to reach the primary lens 506. Although the primary lens 506 is illustrated as a single lens, in some embodiments, the primary lens 506 may comprise a lens assembly comprising a plurality of lenses generally arranged one after another along the direction of travel of light entering the plenoptic sensor device 500.

In some embodiments, the primary lens 506 may be configured to provide low aberration characteristics. For example, for the mini-images on the edges of the sensor to be of sufficient quality, the primary lens 506 can be configured to provide low spherical aberration. In some instances, the primary lens 506 need not be static. For example, the primary lens may comprise a "zoom lens" that is electronically controllable. This may allow "targeted imaging" where one can zoom into a certain area where more information is needed and get a higher resolution image there. It may also be desirable to be able to control the aperture of the primary lens array so that we let in the correct amount of light for the sensor.

The primary lens 506 directs light onto an array of microlenses 508 that are positioned between the primary lens 506 and the image sensor 504. The array of microlenses 508 is configured to focus the light received onto the image sensor 504, with each microlens of the array directing the light received at the microlens onto a corresponding portion or section of the image sensor 504. As will be described in more detail below, this results in the image sensor 504 capturing an image (represented by plenoptic image data) that comprises a plurality of smaller sub-images, with each sub-image capturing a portion of the scene from a slightly different angular perspective.

The microlenses of the array of microlenses 508 can be arranged generally in front of the image sensor 504 between the image sensor 504 and the primary lens 506. The microlenses of the array of microlenses 508 can, in some embodiments, be arranged in a two-dimensional array that lies in a plane that is generally parallel with a plane of the image sensor. In some embodiments, the microlenses are arranged in a grid, comprising rows and columns of microlenses. In some embodiments, the microlenses can be arranged in other configurations as well. For example, adjacent rows or columns can be offset relative to each other to minimize spaces or gaps between adjacent microlenses. In some embodiments, the microlens array could be convex to produce a "fisheye" effect that allows for more peripheral image data to be pulled in. This would have the effect of having higher resolution depth information for elements in the scene at the center of the camera and lower resolution depth information for elements at the edges of the camera.

In some embodiments, the array of microlenses can comprise approximately 200,000 microlenses coupled with a 40 megapixel sensor. In some embodiments, 1,000 to 1,000,000 microlenses may be used depending on the application requirements.

The array of microlenses 508 of the plenoptic sensor device 500 is configured such that each microlens of the array focuses light reflected from the scene onto a corresponding portion of the image sensor 504. This causes the image sensor 504 to capture plenoptic image data of the scene that includes a plurality of sub-images associated with the plurality of microlenses. Each sub-image represents a portion of the image captured from a slightly different perspective. From this plenoptic image data a two-dimensional image of the scene can be generated. The two-dimensional image can be generated from the plenoptic image data at a variety of different focal lengths, allowing different (or even all objects) within the image to be shown in focus. Further, the plenoptic image data can further be used to determine depth or distance to objects within the image. Accordingly, the plenoptic sensor device 500 can, in some embodiments, provide a single sensor that is able to capture both image data (e.g., a two-dimensional image of a scene) as well as three-dimensional data (e.g., data from which distance or depths to objects present within the scene can be determined).

Light from the array of microlenses 508 is focused onto the image sensor 504, which captures and produces the plenoptic image data. In some embodiments, the image sensor 504 comprises an active-pixel sensor, such as a CMOS image sensor. Other types of image sensors can be used as well. In some embodiments, the image sensor 504 is configured to use or otherwise tuned to capture infrared light. Use of infrared light can be advantageous in that such light provides good penetration through adverse conditions (e.g., weather, fog, etc.) as well as at night, while also minimizing light pollution (such light not being visible to humans). In some instances, the infrared light can be light having a wavelength that is commonly used in LiDAR applications (such as 905 nm or 1550 nm, for example).

The infrared light captured by the image sensor 504 can be emitted by the light source 510. In the illustrated embodiments, the plenoptic sensor device 500 includes the light source 510 positioned on or within the housing 502. This need not be the case in all embodiments, though, and any number of infrared light sources can be used to illuminate the scene. In some embodiments, the light source 510 comprises a flood light configured to constantly illuminate the scene with a broad beam of high intensity infrared light. In some embodiments, the light source 510 can be configured to pulse, rather than to illuminate the scene constantly. Pulsing the light source 510 can allow the sensor to determine time of flight information that can, in some instances, also be used to determine distance to objects in the image.

The plenoptic sensor device 500 can advantageously provide both two-dimensional image data of a scene and depth data (e.g., three-dimensional data) to objects within the scene. This can be advantageous as generally separate sensors have been needed to capture both image data and depth data. Previously, image data is captured using a conventional camera device, while depth data is captured using LiDAR sensors. The data from the conventional camera device and the LiDAR device would then need to be registered to a single frame of reference. Because the plenoptic sensor device 500 can provide dual functionality using a single sensor, the need to register or correlate this data is reduced or eliminated, as the plenoptic image data synchronously provides both image and depth data. That is the plenoptic image data captured by the image sensor 504 can be used to determine both two-dimensional image data and three-dimensional data, such as distance to objects.

The plenoptic sensor device 500 can, in some embodiments, provide depth information with a higher point cloud density than traditional LiDAR devices. LiDAR point cloud density is generally limited by the number of LiDAR lasers used (typical numbers of lasers include 32 or 64 lasers) and the speed of rotation of the LiDAR sensor. In contrast, the depth data derived from the plenoptic sensor device 500 is not limited to any number of LiDAR lasers as LiDAR lasers need not be used at all. Rather, the plenoptic sensor device 500 captures infrared light reflected from any number of light sources (including flood light sources, such as the light source 510) allowing for highly increased point cloud density.

In some embodiments, the plenoptic image data captured by the image sensor 504 of the plenoptic sensor device can be analyzed by, for example, one or more components of the autonomous system 202 of FIG. 2 (such as autonomous vehicle compute 202f), one or more components of device 300 of FIG. 3, or one or more components of the autonomous vehicle compute 400 of FIG. 4, in order to determine the image data and depth data associated with the scene. This information can then further be used by these components as inputs for generating signals for operating a vehicle, such as an autonomous or semi-autonomous vehicle.

An additional advantages that is provided by some embodiments of the plenoptic sensor device 500 is that, in some embodiments, the raw data output by the sensor 504 can be passed to the computational hardware of the vehicle for processing (for example, to one or more components of the autonomous system 202 of FIG. 2 (such as autonomous vehicle compute 202f), to one or more components of device 300 of FIG. 3, or to one or more components of the autonomous vehicle compute 400 of FIG. 4). That is, for some embodiments, it is not necessary to include additional pre-processors either on the plenoptic sensor device 500 or elsewhere for preprocessing the image data prior to sending it to the computational hardware of the vehicle. In contrast, typical LiDAR often include a FPGA that preprocesses their sensor data to into a format that can be understood by computational hardware of the vehicle. The plenoptic sensor device 500 can, in some embodiments, send raw data to computational hardware of the vehicle without the need for such preprocessing. That is, the raw data from the plenoptic sensor device 500 can be sent directly to the computational hardware of the vehicle which can process that data to provide object direction and tracking, for example.

In some embodiments, the plenoptic sensor device 500 may be considered a solid state device because it may not need to rotate as conventional LiDAR sensors do.

Figure 6:
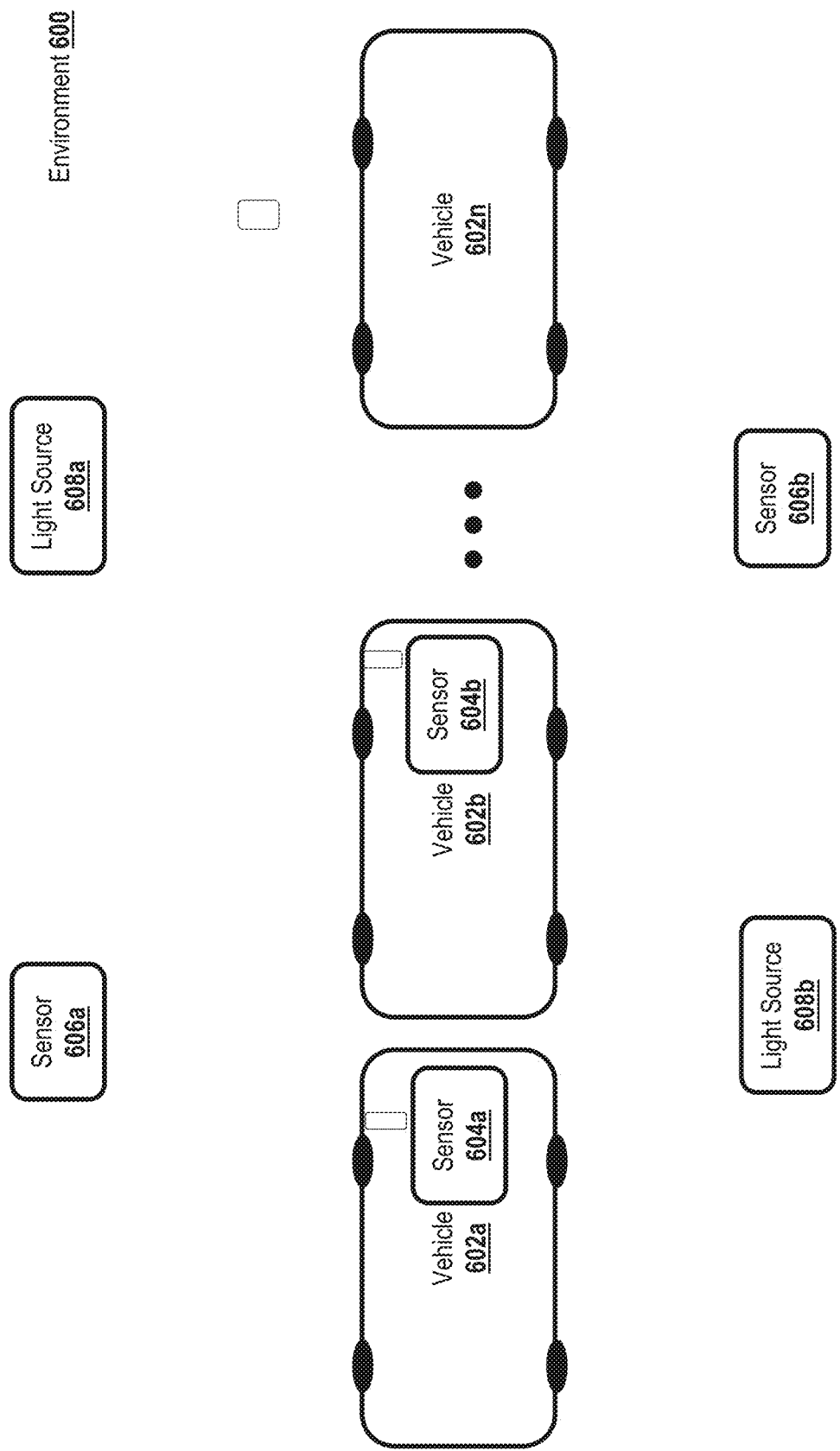
FIG. 6 is an example environment in which vehicles including plenoptic sensors can be implemented.

FIG. 6 is an example environment 600 in which vehicles 602a-602n including plenoptic sensors 604a-604b can be implemented. In the illustrated embodiment, several vehicles 602a-602n are present within the environment. Some of the vehicles 602a-602n may comprises autonomous or semi-autonomous vehicles, while others may comprise traditional vehicles. In the illustrated example, the vehicles 602a, 602b include plenoptic sensor device 604a, 604b. The plenoptic sensor devices 604a, 604b can be similar to the plenoptic sensor device 500 described with reference to FIG. 5. The plenoptic sensor devices 604a, 604b can generate plenoptic image data from which a two-dimensional image of the environment 600 from the point of view of the plenoptic sensor device 604a, 604b can be generated. This plenoptic image data can be used by the vehicles 602a, 602b as an input that facilitates navigation within the environment 600.

In some embodiments, data derived from the plenoptic sensor devices 604a, 604b can be shared with other vehicles to facilitate their navigation as well. For example, data derived from the plenoptic sensor device 604a of the vehicle 602a can be shared with vehicle 602b or vehicle 602n as an aid to the navigation of those vehicles. Such data sharing can be accomplished using, for example, the vehicle-to-infrastructure system 118 as described above with reference to FIG. 1.

FIG. 6 further illustrates that additional plenoptic sensor devices 606a, 606b, which may be similar to the plenoptic sensor device 500 describe with reference to FIG. 5, can also be included throughout the environment 600. These plenoptic sensor devices 606a, 606b can be included on beacons positioned throughout the environment 600 to generate plenoptic image data that can be shared with one or more of the vehicles 602a-602n.

FIG. 6 further illustrates that additional light sources 608a, 608b can be provided in the environment 600 to further illuminate the scene with infrared light which is captured by the image sensors of the plenoptic sensor devices 604a, 604b, 606a, 606b. As discussed herein, the plenoptic sensor devices operate using infrared light reflected from the objects in the scene. An advantage of the plenoptic sensor devices is that additional infrared light sources do not interfere with the functioning of any particular sensor. Rather, additional light sources simply provide additional illumination for the scene.

Figure 7:
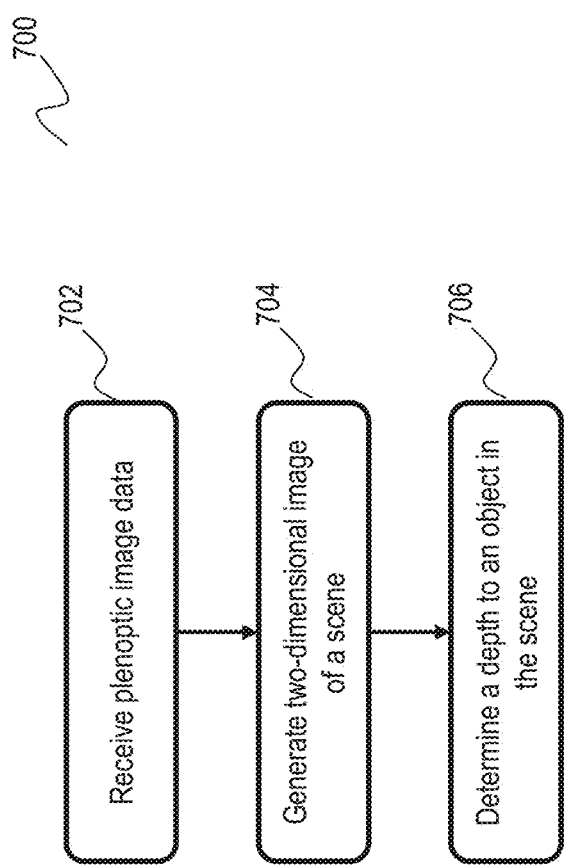
FIG. 7 is a flowchart of an example process for determining image data and depth data using a plenoptic sensor.

FIG. 7 is a flowchart of an example process 700 for determining image data and depth data using a plenoptic sensor device. In some embodiments, one or more of the steps described with respect to process 700 are performed (e.g., completely, partially, and/or the like) by one or more components of the plenoptic sensor device 500 of FIG. 5, one or more components of the autonomous system 202 of FIG. 2 (such as autonomous vehicle compute 202f), one or more components of device 300 of FIG. 3, or one or more components of the autonomous vehicle compute 400 of FIG. 4.

With continued reference to FIG. 7, at block 702, plenoptic image data is received from a plenoptic sensor device. At block 704, a two-dimensional image of a scene is generated based on the plenoptic image data. At block 706, depth to an object in the scene is determined based on the plenoptic image data. In some embodiments, blocks 706 and block 708 can be performed in an opposite order. In some embodiments, blocks 706 and block 708 can be performed simultaneously.

In some embodiments, an AI system (such as an image based neural network) can be trained to take as input the raw multi-perspective camera image from the plenoptic sensor, and output a point cloud similar to what is currently produced by LiDAR sensors. This would serve to minimize the computational impact of processing the plenoptic image and would allow the use previously generated LiDAR point cloud processing for tasks like object detection and tracking in the perception stack.

Examples

Various example embodiments of the disclosure can be described by the following clauses:

Clause 1. A system, comprising: an image sensor configured to generate image data based on infrared light received at the image sensor; a primary lens positioned to direct light from a scene onto the image sensor; and an array of microlenses positioned between the image sensor and the primary lens, each microlens configured to focus the light from the scene onto a corresponding portion of the image sensor.

Clause 2. The system of Clause 1, wherein the image sensor comprises a CMOS image sensor.

Clause 3. The system of Clauses 1-2, further comprising a light source configured to emit infrared light.

Clause 4. The system of Clause 3, wherein the light source is configured to illuminate the scene.

Clause 5. The system of Clauses 3-4, wherein the light source comprises a flood light.

Clause 6. The system of Clauses 1-5, wherein the infrared light has a wavelength of about 905 nm.

Clause 7. The system of Clauses 1-5, wherein the infrared light has a wavelength of about 1550 nm.

Clause 8. The system of Clauses 1-7, wherein the system comprises a solid-state system.

Clause 9. The system of Clauses 1-8, wherein the system is configured to be focusable on objects within the scene that are positioned at least 5 meters from the primary lens.

Clause 10. The system of Clauses 1-9, wherein the system is incorporated into a sensor positioned on an autonomous vehicle.

Clause 11. The system of Clauses 1-9, wherein the system is incorporated into a stationary beacon configured to transmit the image data over a communications network.

Clause 12. A system, comprising: at least one processor; and at least one memory storing instructions thereon, that, when executed by the at least one processor, cause the at least one processor to: receive plenoptic image data representative of a scene from a plenoptic imaging device configured to generate the image data based on infrared light; and based on the plenoptic image data, generate a two-dimensional image of the scene, the two-dimensional image comprising an array of pixels, each pixel having an associated intensity; and for each pixel of the array of pixels of the two-dimensional image, determine a depth to an object represented by the pixel based on the plenoptic image data.

Clause 13. The system of Clause 12, wherein the processor is further configured to cause a light source to emit infrared light.

Clause 14. The system of Clause 13, wherein the processor is further configured to cause the light source to emit the infrared light continuously.

Clause 15. The system of Clause 13, wherein the processor is further configured to cause the light source to emit the infrared light in pulses at a frequency, and wherein the depth is determined based on a time-of-flight information associated with a pulse of emitted light.

Clause 16. The system of any of Clauses 12-15, wherein the plenoptic imaging device comprises: an image sensor configured to generate image data based on infrared light received at the image sensor; a primary lens positioned to direct light from a scene onto the image sensor; and an array of microlenses positioned between the image sensor and the primary lens, each microlens configured to focus the light from the scene onto a corresponding portion of the image sensor.

Clause 17. The system of Clause 16, wherein the image sensor comprises a CMOS image sensor.

Clause 18. The system of Clauses 16-17, further comprising a light source configured to emit infrared light.

Clause 19. The system of Clause 18, wherein the light source is configured to illuminate the scene.

Clause 20. The system of Clauses 18-19, wherein the light source comprises a flood light.

Clause 21. The system of Clauses 16-20, wherein the infrared light has a wavelength of about 905 nm.

Clause 22. The system of Clauses 16-20, wherein the infrared light has a wavelength of about 1550 nm.

Clause 23. A method, comprising: receiving, by a computer system, plenoptic image data representative of a scene from a plenoptic imaging device configured to generate the image data based on infrared light; based on the plenoptic image data, generating, by the computer system, a two-dimensional image of the scene, the two-dimensional image comprising an array of pixels, each pixel having an associated intensity; and for each pixel of the array of pixels of the two-dimensional image, determining, by the computing system, a depth to an object represented by the pixel based on the plenoptic image data.

Clause 24. The method of Clause 23, further comprising causing a light source to emit infrared light.

Clause 25. The system of Clause 24, further comprising causing the light source to emit the infrared light continuously.

Clause 26. The system of Clause 24, further comprising causing the light source to emit the infrared light in pulses at a frequency, and wherein the depth is determined based on a time-of-flight information associated with a pulse of emitted light.

Clause 27. The method of any of Clauses 24-26, wherein the plenoptic imaging device comprises: an image sensor configured to generate image data based on infrared light received at the image sensor; a primary lens positioned to direct light from a scene onto the image sensor; and an array of microlenses positioned between the image sensor and the primary lens, each microlens configured to focus the light from the scene onto a corresponding portion of the image sensor.

Clause 28. The method of Clause 27, wherein the image sensor comprises a CMOS image sensor.

Clause 29. The method of Clauses 27-28, further comprising a light source configured to emit infrared light.

Clause 30. The method of Clause 29, wherein the light source is configured to illuminate the scene.

Clause 31. The method of Clauses 29-30, wherein the light source comprises a flood light.

Clause 32. The method of Clauses 29-31, wherein the infrared light has a wavelength of about 905 nm.

Clause 33. The method of Clauses 29-31, wherein the infrared light has a wavelength of about 1550 nm.

Additional Examples

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously recited step or entity.

What is claimed is:

1. A system, comprising:
    a light source configured to emit infrared light at a wavelength of about 905 nm or about 1550 nm, wherein the light source comprises a floodlight configured to illuminate a scene;
    an image sensor configured to generate image data based on the infrared light received at the image sensor;
    a primary lens positioned to direct the infrared light from the scene onto the image sensor; and
    an array of microlenses positioned between the image sensor and the primary lens, each microlens configured to focus the infrared light from the scene onto a corresponding portion of the image sensor,
    wherein the system is incorporated into a sensor positioned on an autonomous vehicle.

2. The system of claim 1, wherein the image sensor comprises a CMOS image sensor.

3. The system of claim 1, wherein the light source comprises a flood light.

4. The system of claim 1, wherein the system comprises a solid state system.

5. The system of claim 1, wherein the system is configured to be focusable on objects within the scene that are positioned at least 5 meters from the primary lens.

6. The system of claim 1, wherein the system is incorporated into a stationary beacon configured to transmit the image data over a communications network.

7. A system, comprising:
   at least one processor; and
   at least one memory storing instructions thereon, that, when executed by the at least one processor, cause the at least one processor to:
      receive plenoptic image data representative of a scene from a plenoptic imaging device configured to generate the image data based on infrared light, wherein the plenoptic imaging device comprises:
         an image sensor configured to generate image data based on infrared light received at the image sensor, wherein the infrared light is emitted from a light source configured to emit infrared light at a wavelength of about 905 nm or about 1550 nm, wherein the light source comprises a floodlight;
         a primary lens positioned to direct infrared light from a scene onto the image sensor; and
         an array of microlenses positioned between the image sensor and the primary lens, each microlens configured to focus the infrared light from the scene onto a corresponding portion of the image sensor;
      based on the plenoptic image data, generate a two-dimensional image of the scene, the two-dimensional image comprising an array of pixels, each pixel having an associated intensity; and
      for each pixel of the array of pixels of the two-dimensional image, determine a depth to an object represented by the pixel based on the plenoptic image data,
   wherein the system is incorporated into a sensor positioned on an autonomous vehicle.

8. The system of claim 7, wherein the processor is further configured to cause the light source to emit the infrared light.

9. The system of claim 8, wherein the processor is further configured to cause the light source to emit the infrared light continuously.

10. The system of claim 8, wherein the processor is further configured to cause the light source to emit the infrared light in pulses at a frequency, and wherein the depth is determined based on a time-of-flight information associated with a pulse of emitted light.

11. The system of claim 8, wherein the image sensor comprises a CMOS image sensor.

12. The system of claim 8, further comprising a light source configured to emit infrared light.

13. The system of claim 12, wherein the light source is configured to illuminate the scene.

14. A method, comprising:
   receiving, by at least one processor, plenoptic image data representative of a scene from a plenoptic imaging device configured to generate the image data based on infrared light, wherein the processor is incorporated into a sensor positioned on an autonomous vehicle, and wherein the plenoptic imaging device comprises:
      an image sensor configured to generate image data based on infrared light received at the image sensor, wherein the infrared light is emitted from a light source configured to emit infrared light at a wavelength of about 905 nm or about 1550 nm, wherein the light source comprises a floodlight;
      a primary lens positioned to direct light from a scene onto the image sensor, and
      an array of microlenses positioned between the image sensor and the primary lens, each microlens configured to focus the light from the scene onto a corresponding portion of the image sensor;
   based on the plenoptic image data, generating, by the at least one processor, a two-dimensional image of the scene, the two-dimensional image comprising an array of pixels, each pixel having an associated intensity; and
   for each pixel of the array of pixels of the two-dimensional image, determining, by the at least one processor, a depth to an object represented by the pixel based on the plenoptic image data.

* * * * *